United States Patent [19]

Stiefel

[11] 4,304,198

[45] Dec. 8, 1981

[54] APPARATUS FOR EMERGENCY COOLING OF THE STEAM GENERATOR UNIT OF A NUCLEAR POWER PLANT

[75] Inventor: Max Stiefel, Mannheim, Fed. Rep. of Germany

[73] Assignee: Babcock-Brown Boveri Reaktor GmbH, Mannheim, Fed. Rep. of Germany

[21] Appl. No.: 17,659

[22] Filed: Mar. 5, 1979

[30] Foreign Application Priority Data

Mar. 4, 1979 [DE] Fed. Rep. of Germany ....... 2809466

[51] Int. Cl.$^3$ ............................................. F22B 37/42
[52] U.S. Cl. .................................. 122/504; 122/31 R
[58] Field of Search ............... 122/504, 506, 507, 509, 122/442, 443, 389, 390, 407, 31 R; 239/580, 583, 511, 506; 251/145

[56] References Cited

U.S. PATENT DOCUMENTS

| | | | |
|---|---|---|---|
| 1,464,225 | 8/1923 | Stockholder | 122/504 |
| 1,704,989 | 3/1929 | McGill | 122/389 |
| 2,193,795 | 3/1940 | Bredtschneider | 122/31 R |
| 2,298,765 | 10/1942 | Johnson | 239/511 |
| 3,003,706 | 10/1961 | Thorne | 239/511 |
| 3,022,985 | 2/1962 | Mair | 122/31 R |
| 3,530,837 | 9/1970 | Olney | 122/504 |

*Primary Examiner*—Henry C. Yuen
*Attorney, Agent, or Firm*—D. Anthony Gregory; Robert J. Edwards

[57] ABSTRACT

An arrangement for the emergency cooling of the steam generator unit is of a pressurized-water nuclear power plant is disclosed. Steam is passed through a blow-off pipe (11) into a closed vessel (14) having a water space (12) and a gas space (13). A nest of heat exchanger tubes (15) extends through the water space (12) in a heat transfer relationship to cool the water space. Steam is dumped under emergency conditions into the vessel via a steam distributor nozzle (18) operatively connected at the end of the blow-off pipe and is condensed in the water space. The steam distributor nozzle is arranged essentially below and to the side of the nest of heat exchanger tubes to enhance mixing heat transfer. The resulting condensate is returned to the steam generator as condensate.

8 Claims, 4 Drawing Figures

4,304,198

APPARATUS FOR EMERGENCY COOLING OF THE STEAM GENERATOR UNIT OF A NUCLEAR POWER PLANT

TECHNICAL FIELD

The present invention relates to an apparatus for the emergency cooling of the steam generator unit of a nuclear power plant, wherein the blown-off steam is condensed in a closed cycle and the resulting condensate is returned to the steam generator as feedwater.

BACKGROUND ART

A disorder, such as a turbine trip, occuring in a nuclear electric-power production plant may necessitate the rapid shutdown of the nuclear reactor. Until now, the steam in steam generators used in pressurized-water nuclear plants has, at least partially, been dumped to the atmosphere upon an occurence such as a turbine trip. It has been proposed, for example, in German Offenlegungsschrift No. 24 59 150 that the resulting steam be instead condensed in auxiliary heat sinks and that the recovered condensate returned to the steam generator.

Because of the high blow-off efficiency of the blow-off valves, the steam is typically first dumped to atmosphere even when operating with a condenser of known type, since only the amount of heat limited by the design of the condenser and the permitted ultimate heat sink cooling system thermal contamination is removable through the condenser.

In order to assure a sufficient supply of emergency feedwater, sufficiently large tanks or vessels may be needed when other forms of water supply are unavailable or not otherwise usable since auxiliary or emergency condensers of known design are very costly. Furthermore, a feed-in system depending directly on condensation is not regarded to be very reliable.

SUMMARY OF THE INVENTION

In view of this state of the art, the object of the present invention is to improve the efficiency of an emergency cooling system arrangement and apparatus, and to carry out the emergency cooling solely by means of the resulting condensate.

In a preferred embodiment of the invention, the steam is passed through a blow-off pipe into a closed vessel having a water space and a gas space. A nest of heat exchanger tubes extends through the vessel. The blow-off pipe includes an angularly bent end, submerged in the water space, and designed as a steam distributor nozzle or sponger. The steam distributor nozzle is arranged essentially below the next of the heat exchanger tubes.

It is a feature of the inventive arrangement that there is a thermo-syphon effect in the water space and, hence, the efficiency of the apparatus are considerably increased, so that the amount of steam blown off through the associated blow-off valve can be accommodated in a relatively small vessel.

According to a special embodiment of the present invention the end of the blow-off pipe, designed as a steam distributor nozzle, extends parallel to the bottom of the vessel and parallel to a side wall.

The nozzle openings of the steam distribution nozzle are preferably arranged in the upper half of the pipe cross-section, and specifically in a pipe angle range of from 22.5° to 67.5°.

Furthermore, in one embodiment, a flap is provided which is rotatable around a fixed point and which closes the nozzle openings at the steam distributor nozzle, when in one position and serves as a baffle plate when in another position, in the region of the nozzle openings. When the flap is closed, it is ensured that no water penetrates from the vessel into the blow-off pipe. To improve the control of its movement and make it easier to close, the flap is provided with a counterweight, and the flap can be locked in each of its positions.

In a further embodiment of the invention the blow-off pipe, with the flap closed, is charged with nitrogen and the nitrogen cushion is maintained until displaced by steam. The steam distributor nozzle can be rinsed with the aid of the nitrogen and a valve at the angularly bent end of the blow-off pipe.

The gas space of the vessel may be connected with the waste gas purification unit of the nuclear power plant, and the water space of the vessel connected with the waste water treatment unit of the nuclear power plant to expedite handling of a contaminated condensate. In addition, the vessel may have an overflow connected with a redundant vessel. To prevent inadmissible excess pressures, the vessel includes a cover provided with a relief vent.

Thus, an arrangement for the emergency cooling of the steam generator unit of a pressurized-water nuclear power plant is disclosed. Steam is passed through a blow-off pipe into a closed vessel having a water space and a gas space. A nest of heat exchanger tubes extends through the water space in a heat transfer relationship to cool the water space. Steam is dumped under emergency conditions into the vessel via a steam distributor nozzle operatively connected at the end of the blow-off pipe and is condensed in the water space. The steam distributor nozzle is arranged essentially below and to the side of the nest of heat exchanger tubes to enhance mixing heat transfer. The resulting condensate is returned to the steam generator as condensate.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same

DESCRIPTION OF THE PREFERRED EMBODIMENTS

Figure 1:
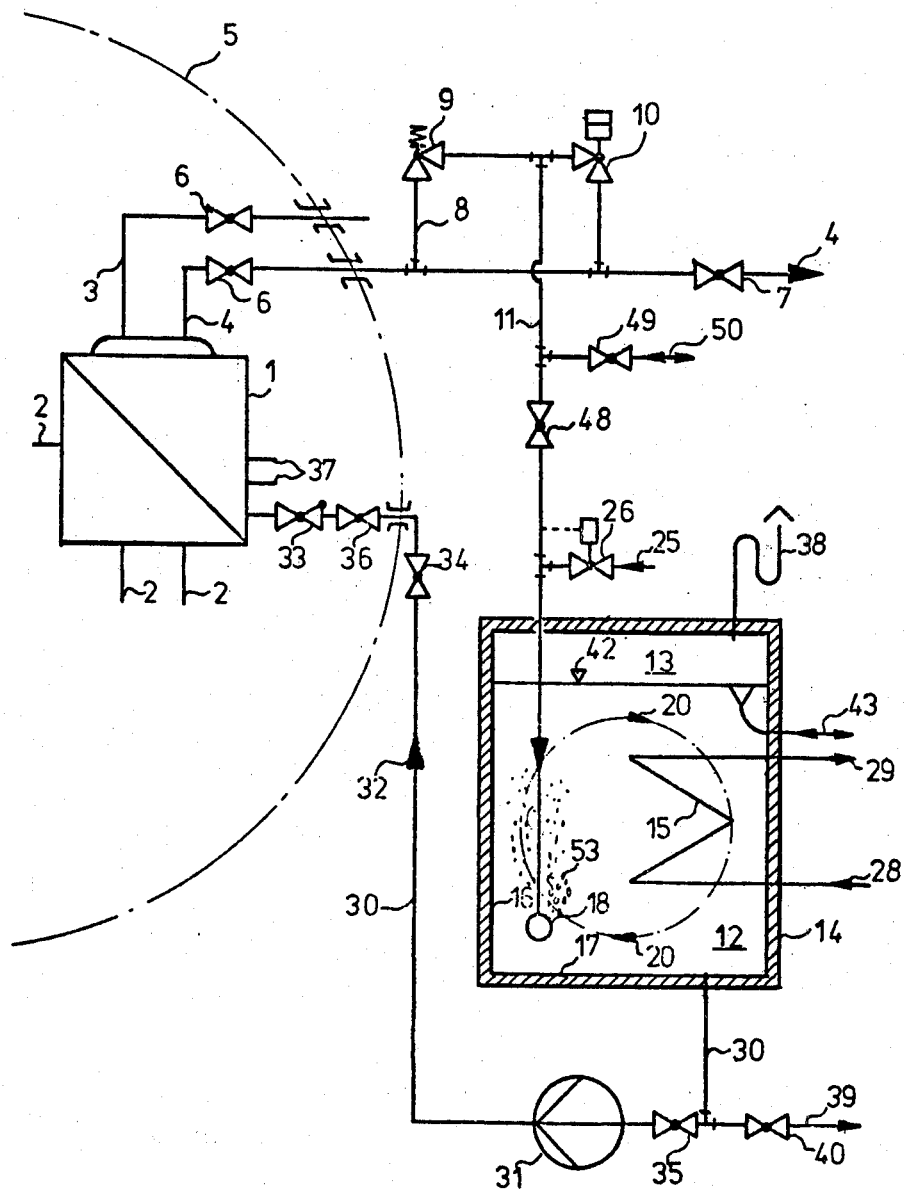
FIG. 1 is a general schematic diagram of a closed emergency cooling system.
Figure 2:
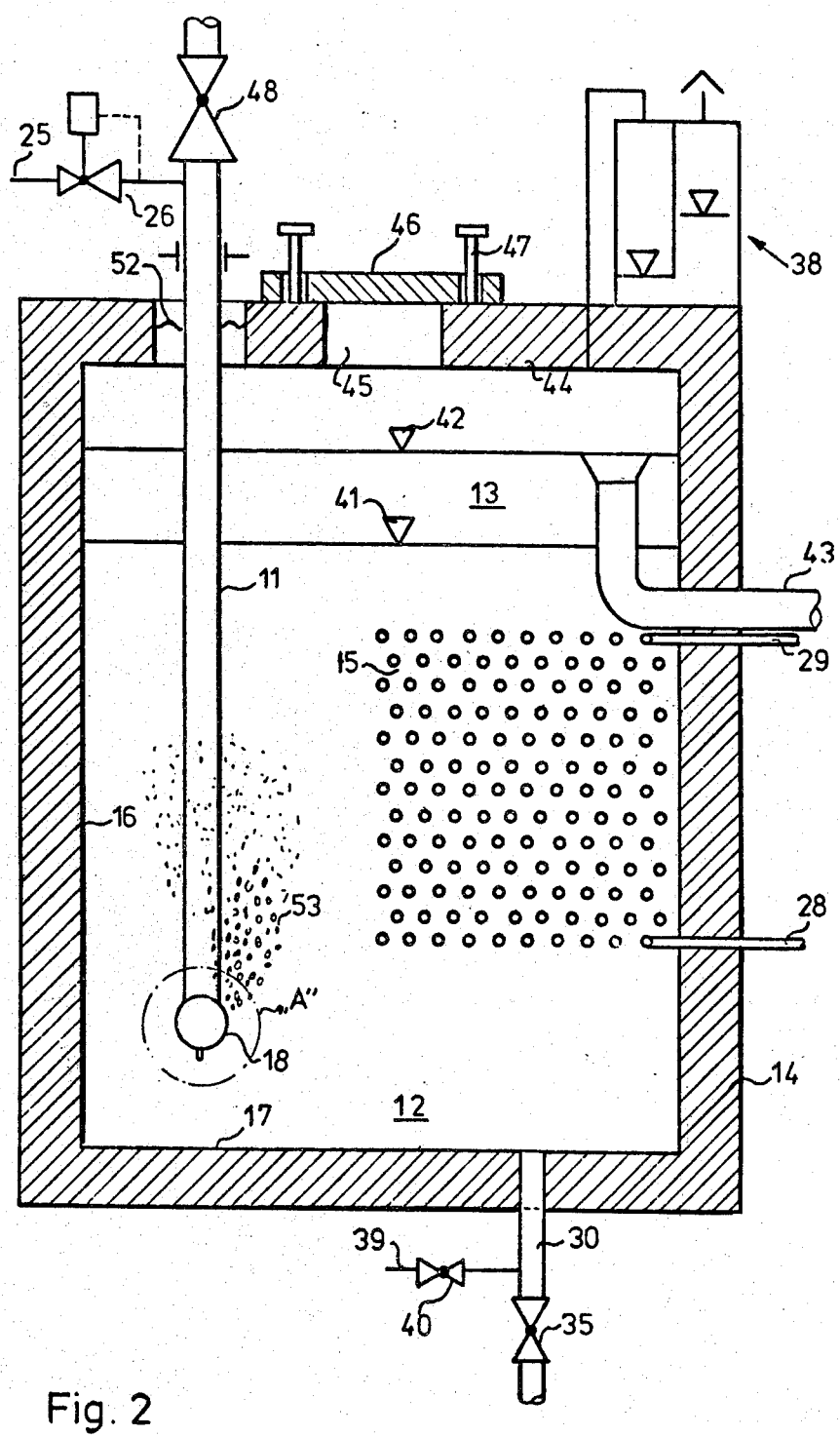
FIG. 2 is an enlarged view of the region of a vessel in the system of FIG. 1.

In FIG. 1, reference numeral 1 designates a nuclear steam generator which is connected with a pressurized-water nuclear reactor (not shown) via the primary coolant pipes 2. The primary cooling water flows through the steam generator 1 heating a feedwater flowing countercurrently therethrough. Steam, which is generated as a result, flows through pipes 3 in the direction of the arrow 4 to a turbine (not shown). The pipes 3, which pass through the safety containment 5, are provided inside and outside this safety containment 5 with isolation valves 6, 7. In the event of an emergency in the nuclear unit it may be necessary to trip the nuclear reactor and close the outer isolation valve 7. Residual reactor heat produced after the trip is removed by means of an apparatus produced in accordance with the invention. For easier visualization, the apparatus is illustrated only as a single pipe 3. Incorporated in a by-pass pipe 8 are a safety relief valve 9 and a blow-off valve 10. When one of these valves 9 or 10 is actuated, which generally occurs upon closing of the isolation valve 7, then the steam is passed through a blow-off pipe 11 into a vessel 14 having a water space 12 and a gas space 13. The steam condenses in vessel 14. The blow-off pipe 11 is passed into the vessel with the aid of a compensator 52. To achieve optimum efficiency a nest of heat exchanger tubes 15 is passed through the water space of the condenser in order to cool the condensate, as can be seen, in particular, in the enlarged drawing of FIG. 2. The end of the blow-off pipe submerged in the water space is bent at a right angle (FIG. 3) and extends parallel to the side walls 16 and to the bottom 17 of the vessel 14. This bent part of the pipe is designed as a steam distributor nozzle 18 and is arranged essentially below and to the side of the nest of heat exchanger tubes.

The nest of heat exchanger tubes is supplied with cooling liquid through a feed pipe 28 and discharge pipe 29.

In view of the activity and pressure relationships there is no need to provide a connection to an intermediate nuclear cooling cycle, that is, the heat exchanger may be cooled either directly with river water or with water from the cooling tower cycle.

The steam to be condensed, represented as steam bubbles 53, flows through the nozzle openings 19 and condenses in the water space 12.

An emergency feedwater pump 31 pumps the cold condensate (in the direction of arrow 32) into the steam generator 1 as feedwater via a pipe 30. Associated with pipe 30 are the shut-off valves 33, 34 and 35 and the back flow barrier 36. At connection sites 37 condensate feed connections can be provided for additional vessels 14.

As a result of this arrangement in accordance with the invention, the circulation of the cold and warm zones in the water space of the vessel 14 is considerably faster, so that an optimum mixing of condensate and steam is achieved. The cold water/warm water circulation of vessel 14 is illustrated by the arrows 20 in FIG. 1.

Figure 3:
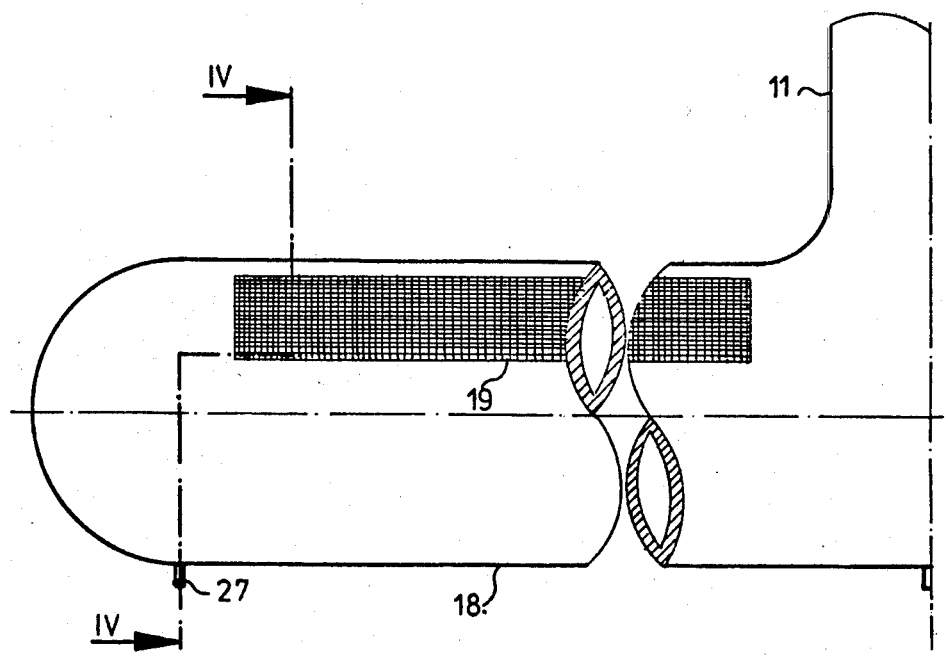
FIG. 3 is an enlarged side view of part "A" of FIG. 2.
Figure 4:
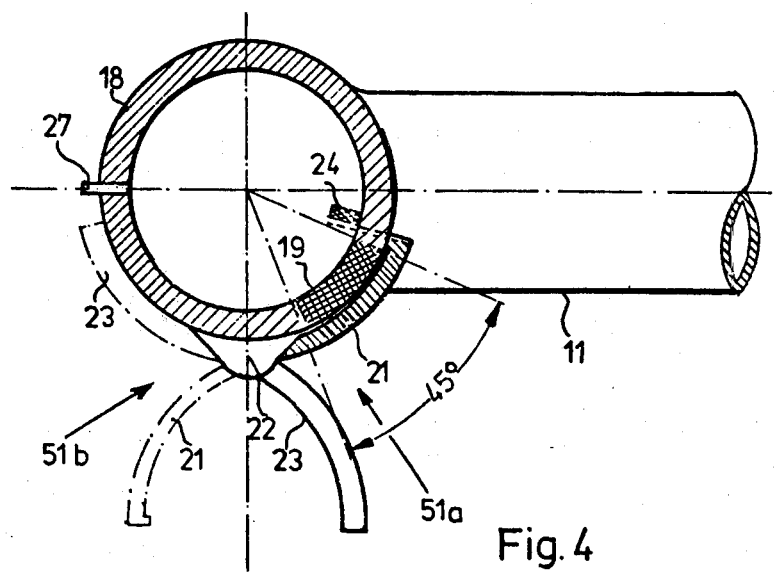
FIG. 4 is a section taken along the line IV—IV of FIG. 3.

The steam distributor nozzle 18, shown in FIGS. 3 and 4, may have on the order of 15,000 nozzle openings 19 of 5 mm diameter in the upper half of the pipe cross-section in a pipe angular region of 45°. When the openings are 20 mm apart and the diameter of the pipe is 1 m, the resulting effective nozzle cross-sectional area is about 0.3 m². Such an arrangement might be utilized to process steam at a pressure of 80 bar and a flow rate of 100 kilograms per second.

To prevent condensation impacts during the introduction of the steam into the steam distributor nozzle 18, the nozzle openings are provided with a flap 21 which is fastened to a support 22 in a rotatable manner and is provided with a counterweight 23 for compensation of the kinetic forces. A safety mechanism 24 locks the flap 21 in the closed position.

Preferably the safety mechanism 24 is released by thermal means, so that the steam flowing out of the blow-off pipe releases the safety mechanism automatically and the flap moves into the open position indicated by the dash-dotted line. In this case the counterweight 23, which may include multiple fingers cantilevered from a base (not shown), serves as a stop and the opened flap as a baffle plate for the outflowing steam. When the blow-off process has been concluded the flap 21 is again swung into the closed position. The counterweight 23 is designed in such a way that it presents less flow resistance of the water than does the flap 21.

Above a certain size it is advisable to use not one but several flaps 21. With the flap closed, the blow-off pipe 11 is continuously charged, through a pipe 25 and a pressure reducing valve 26 regulated by downstream pressure, with nitrogen at a pressure of about 2.1 bar, and any water which may have leaked into the apparatus is removed through a valve 27 disposed at the bottom of the steam distributor nozzle 18. In the same manner, the blow-off pipe can be flushed as far as the steam distributor nozzle. Since the gas space 13 of the vessel also contains nitrogen at a pressure of about 1.1 bar, it is ensured that the contents of the vessel 14 and the inner side of the blow-off pipe do not come in contact with oxygen. In this manner the nitrogen cushion in the blow-off pipe, together with the flap 21, prevent dangerous condensation impacts and water impacts at the start of the blow-off process.

Should increased contamination develop in the interior of the vessel during a disorder as a result of increased operational leakages in the steam generator, then the gas space 13 can be connected with the waste gas processing unit of the nuclear power plant through the ventilating and venting device 38, and the water space 13 can be connected with the water treatment unit of the nuclear power plant through a discharge pipe 39 and a valve 40.

The normal water level of the water space 12 of the vessel 14 is indicated by a reference numeral 41. Should the water level exceed the level 42, then an overflow 43 ensures that a maximum water level is not exceeded. As a protection against excess pressures a cover 44 of the vessel 14 comprises a vent 45 provided with a cover plate 46 which is guided by bolts 47 and whose intrinsic weight is chosen in such a way that the plate lifts off at a given pressure.

For maintenance operations in the vessel 14 the blow-off pipe 11 can be connected with a redundant vessel via the pipe 50, by closing a valve 48 and opening a valve 49.

I claim:

1. An apparatus for emergency cooling of the steam generator unit of a pressurized-water nuclear power plant in which steam is passed through a blow off pipe into a closed vessel free from constant make-up water feed lines and wherein the blown off steam is condensed in a closed circuit and the resulting condensate is returned to the steam generator as feedwater, comprising, in combination, a vessel having water space and a gas space; a nest of heat exchanger tubes extending through the water space of the vessel; a steam distributor nozzle at the end of the blow-off pipe submerged in the water space having an angularly bent end operatively connected to the blow pipe having nozzle openings therein; the steam distributor nozzle is arranged essentially below and to the side of the nest of heat exchanger tubes a flap is rotatably disposed in a holder connected to the steam distributor nozzle in the region of the nozzle openings.

2. An apparatus according to claim 1, wherein the end of the blow-off pipe designed as a steam distributor nozzle extends parallel to the bottom of the vessel and parallel to a side wall.

3. An apparatus according to claim 1 or 2, wherein the nozzle openings are arranged in the upper quadrant of the pipe cross-section adjacent said nest of heat exchanger tubes in a pipe angle range of between 22.5° and 67.5°.

4. Apparatus according to claim 3, wherein said flap closes off the nozzle openings when in one position and serves as a baffle plate when in another position.

5. An apparatus according to claim 4, wherein the flap is provided with a counter-weight.

6. An apparatus according to claim 4, wherein the flap can be locked in each of said positions.

7. An apparatus according to claim 1, wherein the gas space of the vessel is operatively connected with a waste gas purification unit of the nuclear power plant, and the water space of the vessel is connected with a waste water treatment unit of the nuclear power plant.

8. An apparatus according to claims 1 or 7, wherein the vessel has an overflow connected with a redundant vessel.

* * * * *